US 9,621,036 B2

(12) United States Patent
Wibben (10) Patent No.: US 9,621,036 B2
(45) Date of Patent: Apr. 11, 2017

(54) CIRCUITS AND TECHNIQUES FOR IMPROVING REGULATION IN A REGULATOR HAVING MORE THAN ONE MODE OF OPERATION

(71) Applicant: Allegro Microsystems, LLC, Worcester, MA (US)

(72) Inventor: Joshua Wibben, New Brighton, MN (US)

(73) Assignee: Allegro Microsystems, LLC, Worcester, MA (US)

( * ) Notice: Subject to any disclaimer, the term of this patent is extended or adjusted under 35 U.S.C. 154(b) by 188 days.

(21) Appl. No.: 14/132,534

(22) Filed: Jan. 9, 2014

(65) Prior Publication Data

US 2015/0194880 A1    Jul. 9, 2015

(51) Int. Cl.
  *H02M 3/156*  (2006.01)
  *H02M 1/00*   (2006.01)

(52) U.S. Cl.
  CPC .... *H02M 3/156* (2013.01); *H02M 2001/0025* (2013.01); *H02M 2001/0032* (2013.01); *H02M 2001/0045* (2013.01); *Y02B 70/16* (2013.01)

(58) Field of Classification Search
  CPC ......... H02M 2001/0025; H02M 3/156; H02M 2003/1566; H02M 3/158; H02M 3/1588; Y02B 70/1466
  USPC ........................................ 323/282, 284, 285
  See application file for complete search history.

(56) References Cited

U.S. PATENT DOCUMENTS

| 4,479,174 A | 10/1984 | Cates |
| 4,691,156 A | 9/1987 | Takata |
| 4,884,183 A | 11/1989 | Sable |
| 5,162,987 A | 11/1992 | Sambhu |
| 5,481,178 A | 1/1996 | Wilcox et al. |
| 5,731,694 A | 3/1998 | Wilcox et al. |
| 5,745,352 A | 4/1998 | Sandri et al. |
| 5,764,495 A | 6/1998 | Faulk |
| 5,912,552 A | 6/1999 | Tateishi |
| 5,949,226 A | 9/1999 | Tanaka et al. |
| 5,994,885 A | 11/1999 | Wilcox et al. |

(Continued)

FOREIGN PATENT DOCUMENTS

CN       101667019        3/2010

OTHER PUBLICATIONS

Search Report and Written Opinion dated Apr. 10, 2015 for PCT Application No. PCT/US2014/068550; 13 pages.

(Continued)

*Primary Examiner* — Gary L Laxton (74) *Attorney, Agent, or Firm* — Daly, Crowley, Mofford & Durkee, LLP (57) ABSTRACT

A switching regulator control circuit comprises a first control circuit to control conduction of the switch according to a first mode of operation and having a regulation point and a second control circuit to control conduction of the switch according to a second mode of operation in response to a reference signal that is calibrated to have a predetermined relationship with respect to the regulation point of the first control circuit. In some embodiments, the reference signal is calibrated to be a predetermined amount greater than the regulation point of the first control circuit and may be calibrated during the first mode of operation or in response to a regulator start or restart event.

31 Claims, 8 Drawing Sheets

(56) References Cited

U.S. PATENT DOCUMENTS

| | | |
|---|---|---|
| 6,130,528 A | 10/2000 | Aoyama |
| 6,157,182 A | 12/2000 | Tanaka et al. |
| 6,304,066 B1 | 10/2001 | Wilcox et al. |
| 6,307,356 B1 | 10/2001 | Dwelley |
| RE37,609 E | 3/2002 | Bittner |
| 6,366,066 B1 | 4/2002 | Wilcox |
| 6,366,070 B1 | 4/2002 | Cooke et al. |
| 6,396,252 B1 | 5/2002 | Culpepper et al. |
| 6,580,258 B2 | 6/2003 | Wilcox et al. |
| 6,724,174 B1 | 4/2004 | Esteves et al. |
| RE39,065 E | 4/2006 | Nelson |
| 7,030,596 B1 | 4/2006 | Salerno et al. |
| 7,075,280 B2 | 7/2006 | May |
| 7,173,404 B2 | 2/2007 | Wu |
| 7,199,560 B2 | 4/2007 | Cheung et al. |
| 7,990,120 B2 | 8/2011 | Leonard et al. |
| 8,049,481 B2 | 11/2011 | Li et al. |
| 8,242,764 B2 * | 8/2012 | Shimizu .............. H02M 3/1588 323/284 |
| 8,274,270 B2 | 9/2012 | Hsieh et al. |
| 2007/0002595 A1 | 1/2007 | Tzeng |
| 2009/0058388 A1 | 3/2009 | Kanakubo |
| 2010/0320983 A1 | 12/2010 | Wu |
| 2011/0241641 A1 | 10/2011 | Chen et al. |
| 2012/0281447 A1 * | 11/2012 | Heo .................... H02M 3/1588 363/74 |

OTHER PUBLICATIONS

Allegro datasheet A8580, "Wide Input Voltage, 2.4 MHz, 2.5 A Asynchronous Buck regulator With Low-IQ Standby, Sleep Mode, External Synchronization, and NPOR Output", Sep. 4, 2013, 40 pages.

Linear Technology datasheet LT1307/LT1307B, "Single Cell Micropower 600k PWM DC/DC Converters", 1995, 20 pages.

International Preliminary Report on Patentability dated Jul. 21, 2016 for PCT Application No. PCT/US2014/068550; 10 pages.

* cited by examiner

CIRCUITS AND TECHNIQUES FOR IMPROVING REGULATION IN A REGULATOR HAVING MORE THAN ONE MODE OF OPERATION

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to regulators and, more particularly, to regulators having more than one regulation mode.

BACKGROUND OF THE INVENTION

Regulators, or converters, including a switch, sometimes referred to as a power switch, for transferring energy from an input, such as an AC or DC voltage or current source, to a regulated output are well known. In some regulators, sometimes referred to as switching regulators, the switch turns on and off to regulate the output. Such switching regulators include an inductor to convert the switched current pulses into a continuous load current. In other regulators, sometimes referred to as linear regulators, the switch operates in its active, or saturation region.

An important specification of regulators is the desired average output level, which may be referred to as the regulation point. The regulation point is generally specified to have a permissible range to which the regulator will maintain the output over specified conditions, such as load and temperature conditions, as well as over process and circuit variations, such as offsets and gain errors.

Common switching regulator configurations include Buck, Boost, Buck-Boost, flyback, SEPIC, Cúk, half bridge, and full bridge to name a few. As is also well known, various control methodologies for controlling conduction of the power switch can be applied to switching regulators, including Pulse Width Modulation (PWM) and Pulse Frequency Modulation (PFM), and for each of these methodologies, various control techniques are possible including voltage mode control and current mode control along with various feedback and feed forward techniques.

The different methodologies for controlling conduction of the power switch have different advantages and disadvantages. For example, in the case of PWM control, the switch is operated at a fixed frequency, but at a variable duty cycle in order to regulate the output. Since the variable duty cycle permits the peak inductor current to be adjusted as necessary to maintain the desired output level, PWM control is conducive to a wide range of load levels. However, at light loads, PWM control can result in undesirable power dissipation and therefore reduced efficiency since the switch operates at a fixed frequency regardless of the load requirements. In the case of PFM control on the other hand, the switch control signal has a fixed on time, off time, or peak inductor current, but a variable frequency in order to regulate the output. Under PFM control, the lower switching frequency reduces the efficiency loss that results from turning on and off the power switch, but the peak inductor current is limited and thus, PFM control is conducive to lighter load conditions where the limited peak inductor current is sufficient to supply the load.

Some conventional switching regulators can operate in two or more regulation modes in order to get the benefits of different switch control methodologies. For example, in a U.S. Pat. No. 5,481,178 entitled "Control Circuit and Method for Maintaining High Efficiency over Broad Current Ranges in a Switching Regulator Circuit," a current comparator controls switching during higher load current conditions and a hysteretic comparator puts the regulator into a sleep mode during lighter load current conditions. In regulators having two or more regulation modes, the operating conditions under which the regulator transitions between modes can be difficult to establish without adversely impacting efficiency.

SUMMARY OF THE INVENTION

In one aspect of the invention, a switching regulator control circuit for controlling a switching regulator including at least one switch comprises a first control circuit to generate a first control signal to control conduction of the switch during a first mode of operation and having a first input responsive to a first reference signal, a second input responsive to a feedback signal proportional to the regulated output, and an output at which the first control signal is provided and a second control circuit to generate a second control signal to control conduction of the switch during a second mode of operation and having a first input responsive to a second reference signal, a second input responsive to the feedback signal, and an output at which the second control signal is provided. The switching regulator control circuit further includes a regulation mode calibration circuit coupled between the first control circuit and the second control circuit for calibrating the second reference signal in response to the first control circuit. With this arrangement, crossover between the different modes of operation is achieved in a manner that maximizes regulator efficiency.

Features may include one or more of the following. The first control circuit is a PWM control circuit and the second control circuit is a PFM control circuit. A combining circuit is responsive to the first control signal and the second control signal for generating a switch control signal for coupling to the switch. The switch control signal may be a function of the first control signal when the first control signal is greater than a reference signal the first control circuit may comprise an error amplifier to provide the first control signal at a variable level when the first control signal is greater than the reference signal and at a fixed, clamp level when the first control signal is less than the reference signal. The second control circuit may comprise a comparator to provide the second control signal.

The regulation mode calibration circuit may comprise a DAC to provide the second reference signal and the DAC may be adjusted to provide the second reference signal at a level that is a function of the regulation point of the first control circuit. The regulation mode calibration circuit may further comprises a state machine to adjust the DAC until the second reference signal is at a predetermined amount greater than regulation point of the first control circuit. The DAC may be adjusted during the first mode of operation. In one embodiment, the DAC is continuously adjusted during the first mode of operation. The regulator may be forced to operate in the first mode of operation to calibrate the second reference signal. In one embodiment, the state machine increments the DAC, decrements the DAC, or both increments and decrements the DAC to provide the second reference signal at the predetermined amount greater than the regulation point of the first control circuit.

Additional aspects may include use of a delay counter to verify an adjustment to the DAC during a delay time period to avoid adjusting the second reference signal in response to transients in the regulation point. The regulation mode calibration circuit may further comprise a register to increment the DAC for a predetermined duration.

According to a further aspect of the invention, the regulation mode calibration circuit adjusts the second reference signal only in response to a regulator start or restart event. The first control circuit may comprise an error amplifier coupled in a unity gain configuration when the regulation mode calibration circuit adjusts the second reference signal.

Also described is a switching regulator control circuit for controlling a switching regulator comprising at least one switch that conducts to transfer energy from an input source to an output at which a regulated output is provided, the switching regulator control circuit comprising a first control circuit to control conduction of the switch according to a first mode of operation and having a regulation point and a second control circuit to control conduction of the switch according to a second mode of operation in response to a reference signal that is calibrated to have a predetermined relationship with respect to the regulation point of the first control circuit. In one embodiment, the first mode of operation is PWM operation and the second mode of operation is PFM operation. The reference signal may be calibrated to be a predetermined amount greater than the regulation point of the first control circuit as may be achieved when the regulator operates in the first mode of operation or alternatively only in response to a regulator start or restart event.

According to a further aspect of the invention, a method of controlling a transition between two modes of operation in a regulator comprises determining a regulation point associated with a first mode of operation and calibrating a reference signal used during a second mode of operation in accordance with the regulation point. The first mode of operation may be PWM operation and the second mode of operation PFM operation. Calibrating the reference signal may comprise setting the reference signal to a predetermined amount greater than the regulation point and may also comprise maintaining the reference signal at the predetermined amount greater than the regulation point.

In one embodiment, the reference signal is calibrated when the regulator operates in the first mode of operation. The regulator may be forced to operate in the first mode of operation to calibrate the reference signal. Calibrating the reference signal may comprise incrementing the reference signal, decrementing the reference signal, or both incrementing and decrementing the reference signal. Calibrating the reference signal may also comprise verifying the incrementing or decrementing of the reference signal to avoid calibrating the reference signal in response to transients in the regulation point. In one embodiment, calibrating the reference signal comprises adjusting the reference signal during a predetermined duration in response to a regulator start or restart event.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
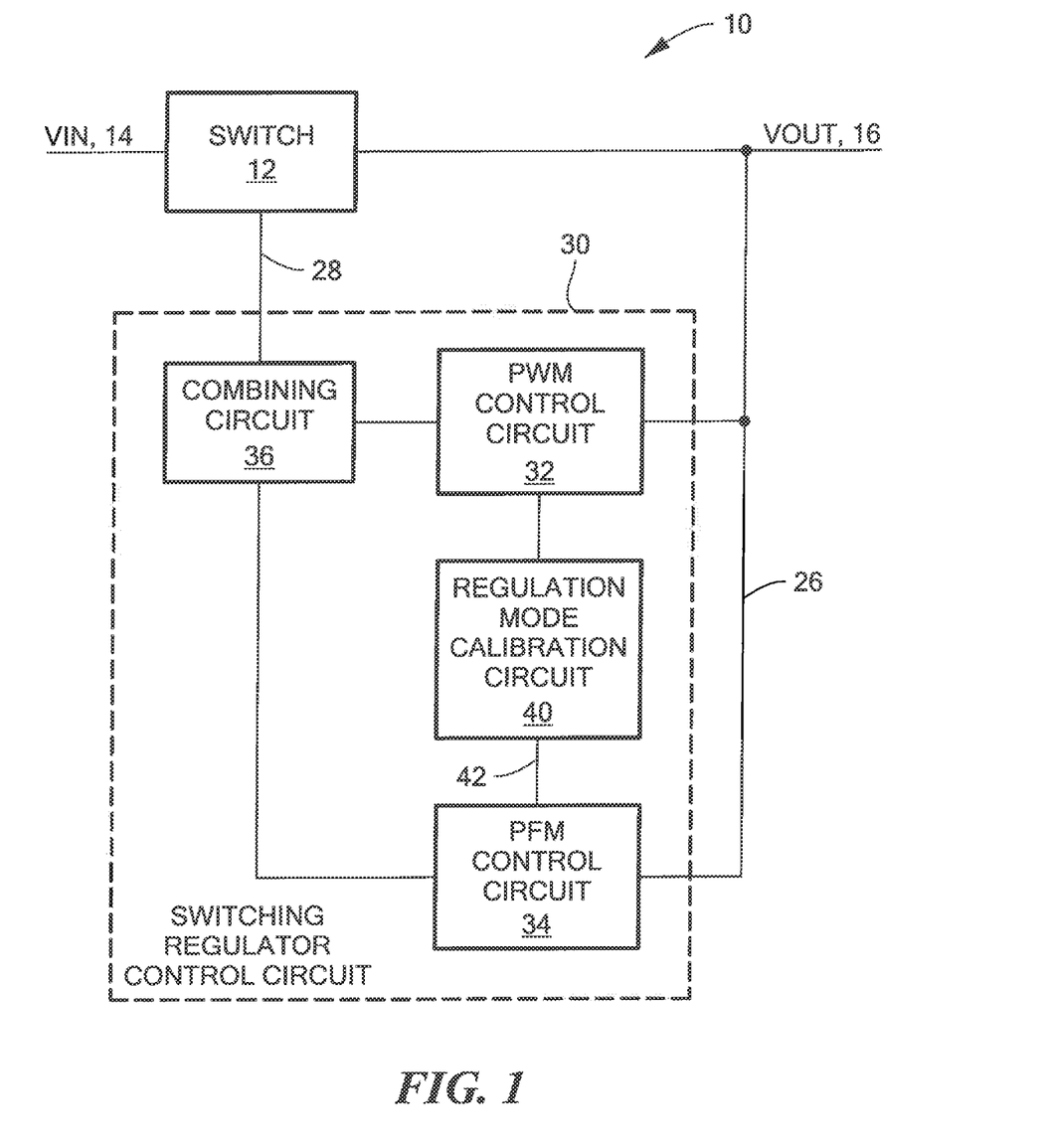
FIG. 1 is a block diagram of a switching regulator containing a regulation mode calibration circuit.

Referring to FIG. 1, a regulator 10 includes a regulator switch 12 that conducts to transfer energy from an input source VIN, 14 to an output at which a regulated output VOUT, 16 is provided. A regulator control circuit 30 generates a switch control signal 28 to control conduction of the switch 12 and includes at least two control circuits each associated with a different mode of operation, such as a PWM control circuit 32 and a PFM control circuit 34. Each of the control circuits 32, 34 is responsive to a respective reference signal and a feedback signal 26 proportional to the regulated output, and provides a respective control signal for processing by a combining circuit 36 to generate the switch control signal 28. A regulation mode calibration circuit 40 is coupled between the PWM control circuit 32 and the PFM control circuit 34 and, in one embodiment, calibrates the PFM reference signal 42 in response to the PWM control circuit 32.

More particularly, the regulation mode calibration circuit 40 calibrates the PFM regulation point to be close to the PWM regulation point and in one embodiment just above the PWM regulation point. With this arrangement, the output 16 is maintained to within a tight regulation range over the specified load range and operating conditions with little change occurring when the regulator transitions between operating modes. One illustrative regulator provides the output 16 in PFM mode to be within approximately 1% of the output in PWM mode.

Multiple mode regulators of various types will benefit from the regulation mode calibration circuit 40 and related techniques described herein, which circuits and techniques are most generally applicable to any regulator which operates in more than one regulation mode. For example, the regulator 10 may be a switching regulator, such as the type shown in FIG. 2, or a linear regulator. Furthermore, the regulator 10 may be an AC to DC regulator in which the input source 14 is an AC voltage or current source, a DC to DC regulator in which the input source 14 is a DC voltage or current source, a current regulator providing a regulated current at the output 16, or a voltage regulator providing a regulated voltage at the output 16, as examples. The illustrated embodiments are DC to DC switching voltage regulators.

Figure 2:
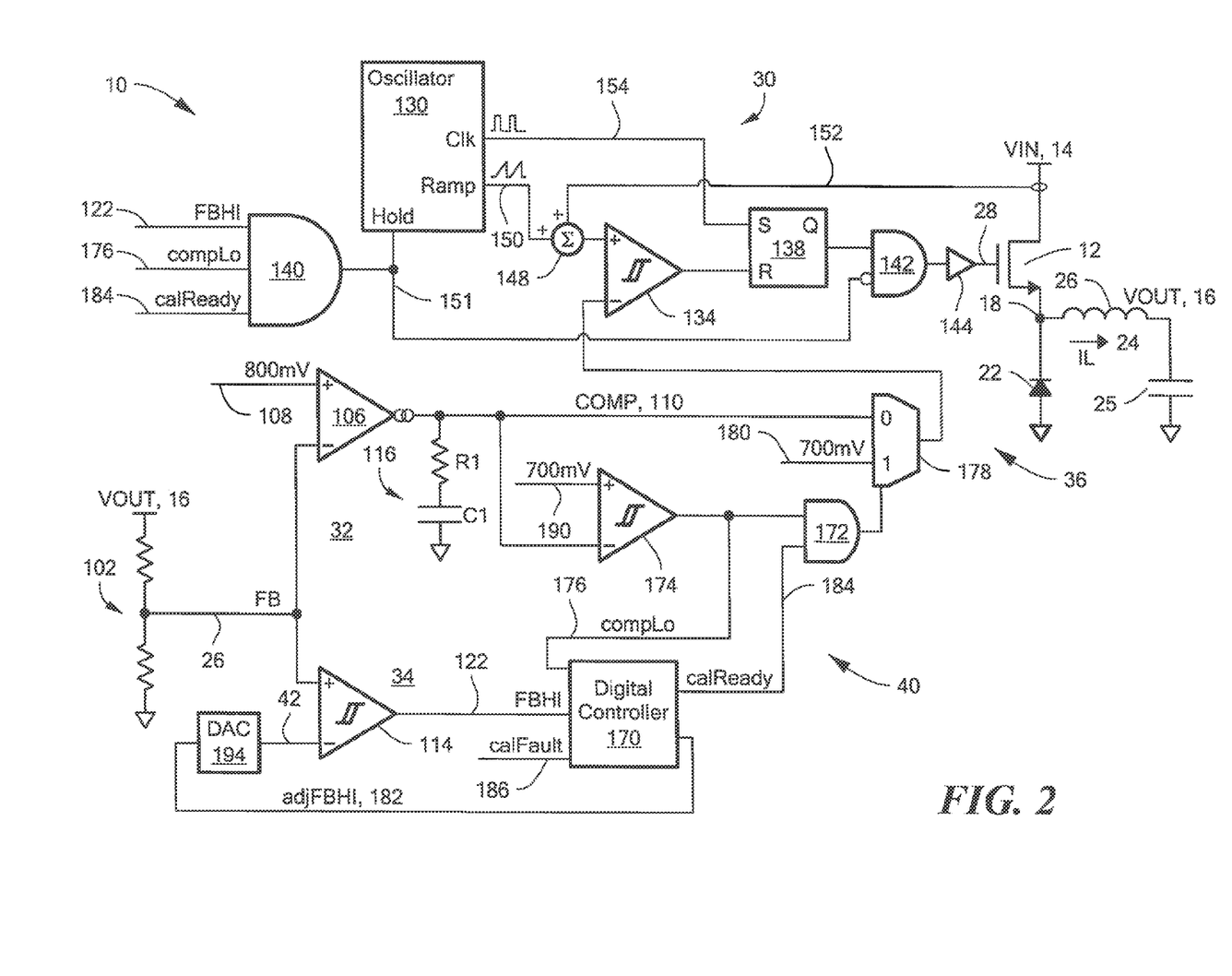
FIG. 2 is a simplified schematic of a switching regulator according to an embodiment.

Referring also to FIG. 2, in which like elements are labeled with like reference numbers, the regulator 10 includes a diode 22 and an output capacitor 25 across which the regulated output voltage VOUT, 16 is provided. An inductor 26 is coupled between the switch 12 and the regulator output 16. The illustrative regulator 10 is a Buck regulator and the switch 12 is here shown to be a Metal Oxide Field Effect Transistor (MOSFET); however, it will be appreciated by those of ordinary skill in the art that the regulator may be configured in various topologies and the switch, which can include more than one switch, can take various forms.

The switch 12 conducts at a duty cycle $D_T$ established by the switch control signal 28 coupled to a control terminal of the switch, here a gate terminal of the FET, so as to maintain the output voltage VOUT to within a specified voltage range, referred to alternatively as the regulation range. The switching regulator control circuit 30 includes, generally, the PWM control circuit 32, the PFM control circuit 34, combining circuit 36, and a regulation mode calibration circuit 40.

Various control schemes can be used to establish the switch control signal 28, such as voltage mode or current mode. In the illustrative embodiment, a resistor divider 102 coupled to the regulator output 16 is used to establish feedback signal FB, 26 that is proportional to the output voltage VOUT and is coupled to the PWM control circuit 32 and to the PFM control circuit 34.

The PWM control circuit 32 includes an error amplifier 106 having an inverting input coupled to the feedback signal 26, a non-inverting input that receives a reference signal 108, and an output at which a COMP signal 110 is provided. The COMP signal 110 governs the switch operation during the PWM regulation mode to control the peak current in the inductor 26 using the current mode control loop consisting of current comparator 134, SR latch 138, and oscillator 130. The PWM control circuit 32 may further include slope compensation circuitry, here in the form of a summing element 148 that combines a ramp signal 150 provided by the oscillator 130 with a current signal 152 indicative of the input current from the input source 14. The PWM control circuit may also be realized with voltage mode control in which case the current comparator 134, SR latch 138, and oscillator 130 would be replaced with a voltage to duty cycle circuit which is generally realized with a duty cycle comparator coupled to the COMP signal and a fixed frequency voltage ramp oscillator replacing oscillator 130.

The PFM control circuit 34 includes a PFM comparator 114 having a non-inverting input coupled to the feedback signal 26, an inverting input that receives the reference signal 42, and an output at which a FBHI signal 122 is provided. The PFM control circuit 34 also includes AND gate 140 that provides control signal 151 to oscillator 130 (for both voltage mode and current mode). The PFM control circuit shares the current comparator 134 and SR latch 138 with the PWM control circuit, but utilizes a fixed 700 mV reference 180 instead of the COMP signal 110. For voltage mode control, a voltage to duty cycle comparator would operate with a fixed on time based on the 700 mV reference 180.

Regulation mode calibration circuit 40 includes a digital controller 170 that monitors a compLo signal 176 and the FBHI signal 122 to calibrate the PFM regulation point by adjusting the PFM reference signal 42 with DAC 194. The calibration circuit 40 also includes AND gate 172 and provides a calReady signal 184 to AND gate 140 to gate the operation of PFM mode. The PFM control circuit is illustrated with an asynchronous Buck, however, if applied to a synchronous converter, AND gate 142 would also halt the operation of a low side switch in addition to high side switch 12.

The PWM and PFM control circuits operate independently of one another and only one at a time. The combining circuit 36 is responsible for selecting the active control circuit 32, 34 and includes comparator 174, analog multiplexer 178, AND gate 142, and the compLo signal 176 coupled to AND gate 140. The combining circuit 36 is responsive to the PWM control signal COMP 110, and selects the PWM control circuit 32 when compLo signal 176 is logic low resulting in COMP signal 110 controlling the operation of switch 12. The combining circuit selects the PFM control circuit 34 when compLo signal 176 is logic high (and the calReady signal 184 is high) resulting in FBHI signal 122 controlling the operation of switch 12. Since COMP signal 110 is proportional to the load current, this implementation results in the selection of the PWM control circuit at heavy loads and PFM control circuit at light loads.

While the various circuit portions, such as the PWM control circuit 32, the PFM control circuit 34, the regulation mode calibration circuit 40, and the combining circuit 36 are described as comprising various particular components, it will be appreciated that many elements are shared amongst more than one circuit portion and these circuit portion names and delineations are illustrative only and can be varied.

In general, a clock signal 154 from the oscillator 130 sets the latch 138 and the output of the current comparator 134 resets the latch. Given the buffer 144, that acts as a gate driver, and NMOS switch 12, setting the latch 138 corresponds to turning on the switch 12 and resetting the latch corresponds to turning off the switch 12.

During PWM operation, the switch duty cycle is controlled by the current comparator 134 which resets the SR latch 138 when the inductor current crosses the level set by error amplifier 106. This arrangement results in COMP signal 110 being proportional to the load current, which in turn results in tight regulation of the output 16 over load variations and transients, but undesirable losses under light load conditions due to the constant switching frequency.

The COMP signal 110 is coupled to the multiplexer 178 which in turn provides the inverting input to the current comparator 134. Multiplexer 178 receives, in addition to the COMP signal 110, a predetermined reference voltage 180, such as the illustrated 700 mV. Control of the multiplexer 178 by comparator 174 is gated by the regulation mode calibration circuit 40 with AND gate 172, and is set to the 700 mV reference 180 when COMP signal 110 is below the 700 mV reference (190 and 180). COMP signal 110 is indicative of the inductor 26 current, and therefore reference 190 sets the load current that results in multiplexer 178 changing state. In particular, the FBHI output signal 122 of the PFM comparator 114 is coupled to digital controller 170 that is additionally responsive to the compLo signal 176 and a calFault signal 186. The compLo signal 176 is provided at the output of comparator 174 that receives as inputs the COMP signal 110 and reference voltage 190, such as the illustrative 700 mV. The digital controller 170 provides as output signals, a signal adjFBHI 182 and a calReady signal 184. The signal 182 controls a DAC 194 that provides the reference signal 42 to the PFM comparator 114, as shown. The calReady signal 184 is asserted when it is determined (such as with the calibration routine described below) that the PFM threshold 42 has been properly calibrated.

The digital controller 170 and the DAC control signal 182 generated by the controller will be described in connection with FIG. 4. Suffice it to say here that the DAC control signal 182 controls the DAC 194 to adjust the PFM reference signal 42 so as to bring the reference signal 42 to a level that causes the PFM regulation point to be close to (and preferably just above) the PWM regulation point.

The DAC 194 range is selected to be large enough to support the total variation of the FB signal 26, and a least significant bit (LSB) weight, or step size, is selected to be small enough to provide the desired load regulation because the step size determines how close the PFM regulation point can be in relation to the PWM regulation point. In one implementation, the DAC 194 has 16 steps with a 4 mV bit weight and DC offset to provide a DAC range from 780 mV to 840 mV. This DAC range is centered on an 800 mV reference plus the nominal offset of the error amplifier 106 and the PFM comparator 114.

The error amplifier 106 provides a current that charges a capacitor in a series-coupled resistor capacitor arrangement 116 to provide the COMP signal 110 at an input of the multiplexer 178, as shown.

Figure 3:
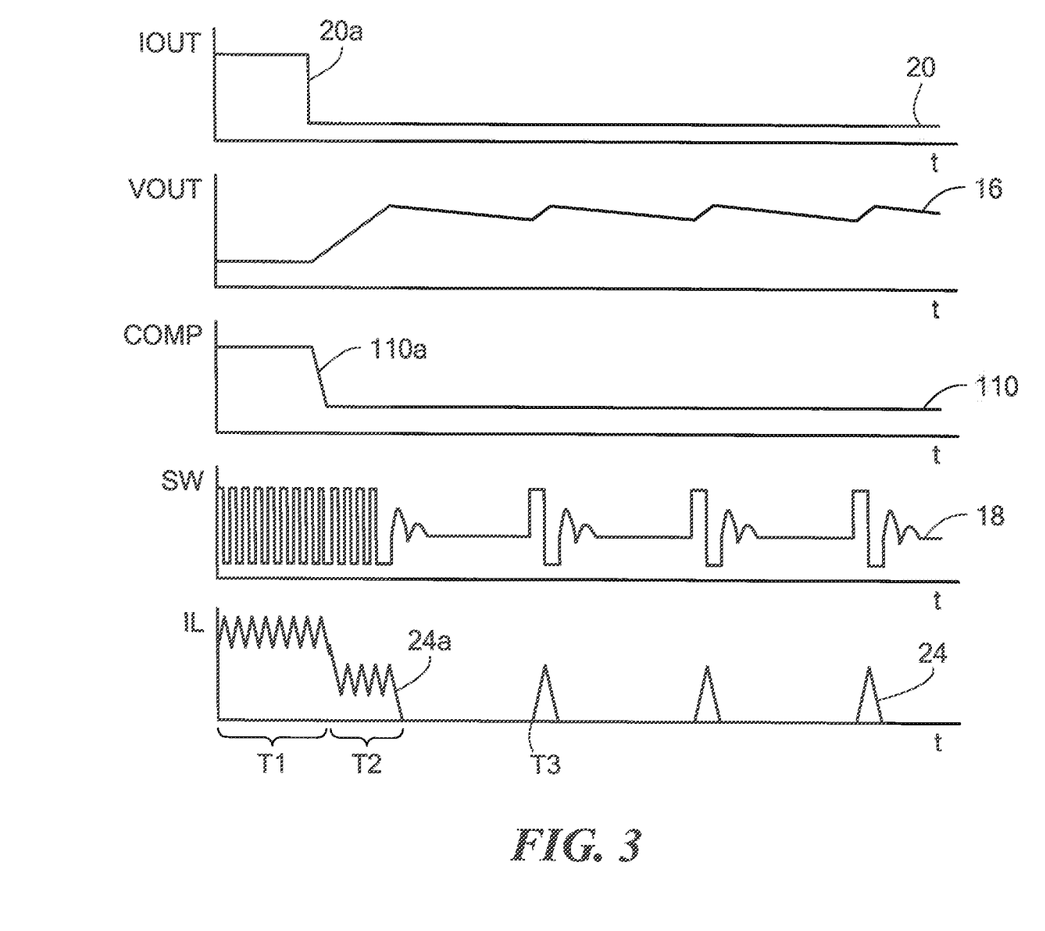
FIG. 3 shows several illustrative waveforms associated with the regulator of FIG. 2.

Referring also to FIG. 3, illustrative waveforms associated with the regulator 10 of FIG. 2 are shown, including the output current IOUT 20, the output voltage VOUT 16, the COMP signal 110, the voltage at a switch node 18, and the current IL 24 through the inductor 26.

Under heavy load steady state conditions, as occurs during time period T1, the FB signal 26 essentially equals the error amplifier reference voltage 108 and the COMP signal 110 therefore remains at a constant value that maintains a peak inductor current that supports the load. When the load current drops as shown at reference character 20a, the FB signal 26 will rise above the error amplifier reference voltage 108 due the excessive peak inductor current that the COMP signal is causing to be delivered. As a result of the higher FB signal, the COMP signal 110 will slew downward as shown at reference character 110a to correct the excessive peak inductor current.

Normally in PWM mode, the FB signal 26 would begin to approach the reference signal 108 when the COMP signal reaches a peak inductor current that matches the load. However with the use of comparator 174 and multiplexer 178, the compLo signal 176 transitions from low to high when the COMP signal 110 drops below reference voltage 190. Under such circumstances, if the calReady signal 184 is also high, as occurs when the PFM reference 42 is properly calibrated, the multiplexer control signal provided by AND gate 172 will toggle causing the multiplexer 178 to provide the predetermined voltage level 180, referred to herein as a clamp level, as the non-inverting input to the current comparator 134. The clamp level 180 is selected to ensure that the non-inverting input to the current comparator 134 does not fall below a predetermined minimum level, thereby forcing the inductor current 24 to stay above the level demanded by the load. As a result, the FB signal 26 will continue to rise until the PFM comparator 114 trips, transitioning the FBHI signal 122 from low to high and tri-stating the switch node 18 via AND gate 142. When the FBHI signal 122 is low, the regulator operates in PWM mode under the control of the current comparator 134 with predetermined minimum level labeled 24a as shown during time period T2.

The particular manner of establishing and adjusting the PFM reference signal 42 (i.e., calibrating the reference signal 42) will be described below. Suffice it to say here that once the PFM comparator 114 trips, at the end of time T2, the comparator output signal FBHI 122 transitions to a high level and PFM mode begins.

In PFM mode, inductor current 24 is fixed at the predetermined minimum level and the switch frequency will vary with the load requirements. The level of the compLo reference 190 is selected to allow a crossover between PWM and PFM regulation that maximizes regulator efficiency. The load is supported by the output capacitor 25 and discharges the output capacitor 25 until the feedback voltage 26 drops below the PFM comparator reference 42 to trip the comparator again.

More particularly, PFM regulation is controlled with logic elements 140 and 142 in response to the FBHI signal 122 (which transitions when the feedback signal 26 falls to below the reference signal 42), the compLo signal 176, and the calReady signal 184, each of which is coupled to an input of AND gate 140. When all three input signals to the AND gate 140 are asserted, the switch control signal 28 goes high to turn on the switch 12, as occurs at time T3 in FIG. 3.

Figure 4:
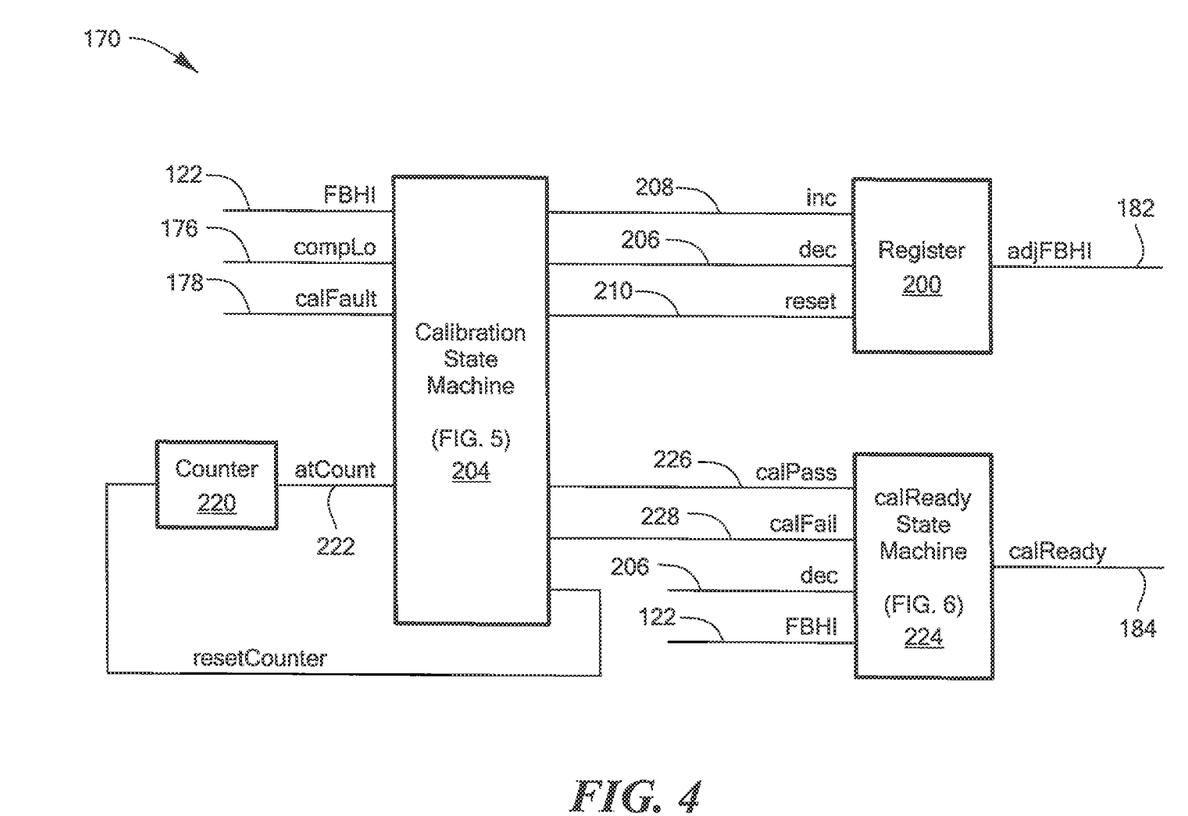
FIG. 4 is a schematic of an illustrative digital controller for use with the regulator of FIG. 2.

Referring also to FIG. 4, the digital controller 170 includes a register 200 that provides the DAC control signal 182 and is controlled by a calibration state machine 204 that provides to respective inputs of the register, a decrement signal 206, an increment signal 208, and a reset signal 210. The reset signal 210 sets the DAC 194 to the nominal value, 800 mV, the increment signal 208 increments the DAC, and the decrement signal 206 decrements the DAC. The digital controller 170 also includes a delay counter 220, as may be implemented with a ripple counter, coupled to the calibration state machine 204 to prevent the calibration routine from responding falsely to transient conditions as will be described. The calReady output signal 184 of the digital controller is provided by a second, calReady state machine 224 that is controlled by the calibration state machine 204 through calPass and calFail signals, 226, 228, respectively, and also accounts for the state of the FBHI signal 122 and whether the register 200 has been decremented.

The digital controller 170 adjusts the DAC value (i.e., the PFM comparator threshold 42) such that the PFM regulation point sits just above the PWM regulation point. Adjusting the PFM comparator threshold 42 involves monitoring the output of the PFM comparator (i.e., the FBHI signal 122), while adjusting the DAC 194. In particular, when the FBHI signal 122 is asserted during PWM regulation (e.g., FBHI=1), the calibration state machine 204 will increment the PFM threshold 42 by one LSB (least significant bit) because the PFM regulation point is at or below the PWM regulation point. The state of the FBHI signal 122 is rechecked and incremented during the subsequent clock cycles if the FBHI signal is still asserted.

The calibration state machine 204 also verifies that the PFM comparator reference 42 is not excessively above the PWM regulation point by decrementing the DAC 194. This is important because load conditions can change the PWM regulation point in either direction.

In addition to incrementing/decrementing the PFM reference 42 according to the PWM regulation point, calibration also includes delay filtering to prevent the calibration process from being affected by transients that can cause the PWM regulation point to increase or decrease momentarily. To this end, when the FBHI signal 122 is asserted during calibration, the state machine 204 enters a wait state before incrementing the DAC 194, as is implemented by counter 220 that provides an atCount signal 222 to the calibration state machine 204. After the wait state is completed, the FBHI signal 122 is rechecked and the DAC is incremented in the next cycle if FBHI=1, or its value is held if FBHI=0. Decrementing the DAC 194 also utilizes the delay filter to prevent erroneous movements in the DAC value. The number of counts for the delay filter is selected such that its duration is longer than the time required to recover from a transient, which is dictated by the crossover frequency set by the error amplifier's compensation.

Figure 5:
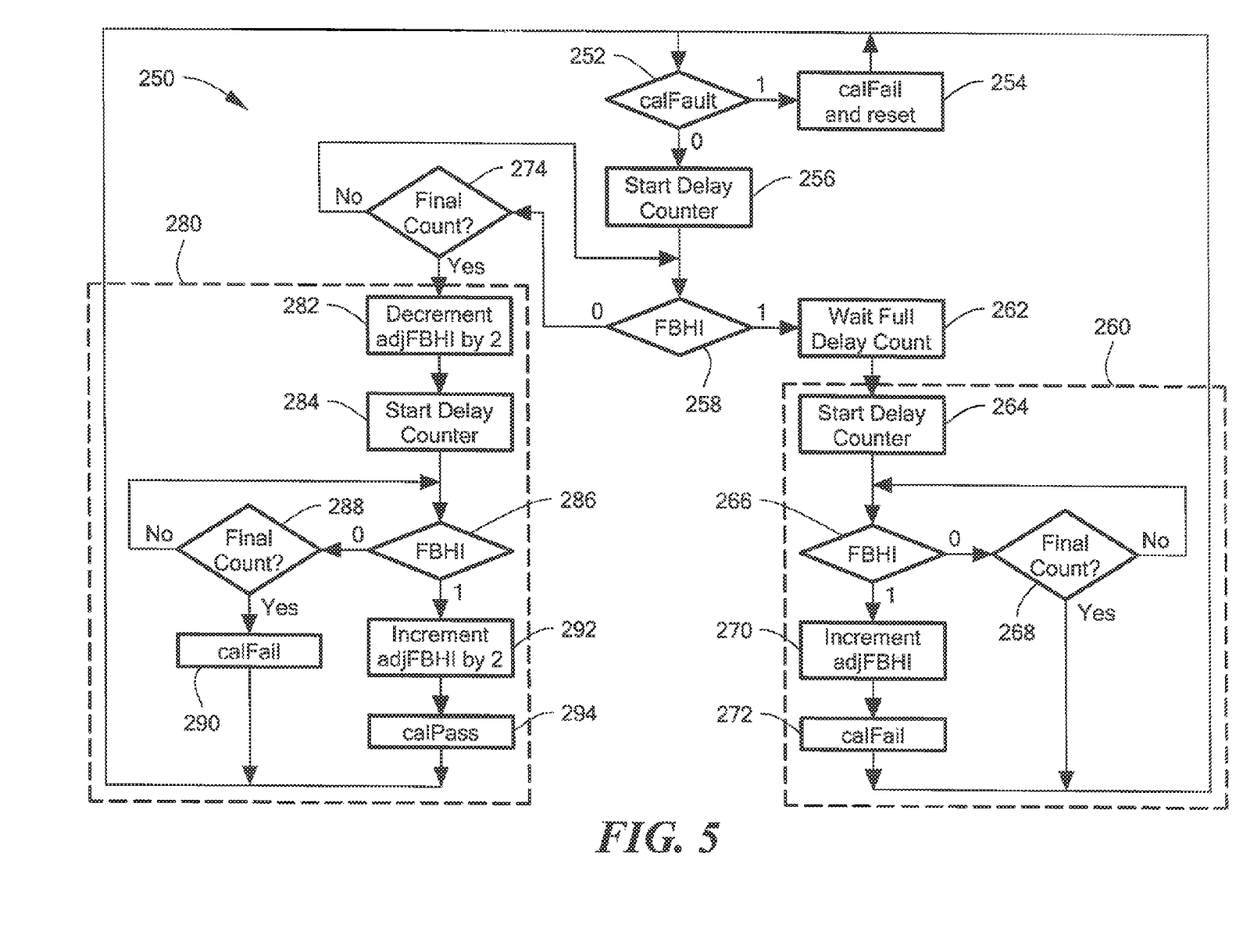
FIG. 5 is a flow diagram illustrating operation of the calibration state machine of FIG. 4.

Referring also to FIG. 5, a flow diagram 250 illustrating operation of the calibration state machine 204 is shown.

Calibration of the PFM regulation point is performed in a manner that allows the PFM regulation point to automatically track variations in the PWM regulation point, such as may be caused by process variations and application conditions. More particularly, the reference signal 42 is calibrated to have a predetermined relationship with respect to the regulation point of the PWM control circuit.

Calibration commences at decision block 252 by verifying that no faults exist as indicated by the calFault signal 186 (FIG. 2). The calFault signal 186 is an indicator of all of the regulator faults of interest, such as a Power On Reset and thermal shut down for example, and may be implemented simply with an OR gate (not shown for simplicity of illustration). If the calFault signal 186 becomes asserted at any time during the calibration process, then calibration will recommence as indicated at block 254, the register 200 will be reset, and the calFail signal 228 coupled to the calReady state machine 224 will be set. When the register 200 is reset, the DAC 194 is set to the nominal value, which is in the center of the calibration range, to speed up the time it takes to find the calibrated threshold 42. If the register 200 were reset to the lowest value, in most cases, the calibration process would have to travel through half of the DAC values to calibrate the threshold.

If it is determined in decision block 252 that no faults are present, then the delay counter 220 is started at block 256. In decision block 258, the state of the FBHI signal 122 is checked. If FBHI=1 at any time, then the calibration state machine 204 checks if the DAC value (i.e., PFM reference 42) is too low, as represented by the blocks within dotted line box 260, after waiting for the full delay count in block 262. If on the other hand FBHI=0 and remains in this state for the full delay count (as determined in decision block 274), then the calibration state machine 204 checks if the DAC value (i.e., PFM reference 42) is too high, as represented by the blocks within dotted line box 280.

The manner in which the calibration state machine 204 checks whether the PFM reference signal 42 is too low commences at block 264, by restarting the delay counter 220. In decision block 266, it is determined whether the FBHI signal 122 is asserted. If the FBHI signal 122 is not asserted, then it is determined at decision block 268 whether the delay counter 220 has reached its full delay count. If FBHI=0 for the full delay count, then the DAC value is maintained at its current value, because the initial FBHI=1 that started this sequence was probably due to a transient event. However, if the FBHI signal is asserted, then the DAC value is incremented at block 270 and the calFail flag 228 is set at block 272, because the initial FBHI=1 remained true even after waiting the full delay count, thereby indicating that the PFM comparator reference 42 is too low and needs to be corrected by increasing the DAC value.

The manner in which the calibration state machine 204 checks whether the PFM reference signal 42 is too high commences at block 282 by temporarily decrementing the DAC value 182 by a predetermined amount, such as two, and restarting the delay counter at block 284. With the delay counter running, the FBHI signal 122 is continuously monitored in decision block 286. If the FBHI signal 122 remains low for the full delay count (as determined at decision block 288), then the calFail flag 228 is set at block 290 and the DAC value will remain at the decremented value because the PFM comparator threshold 42 is too high. If at any time during the delay count, the FBHI signal 122 goes high, then the DAC will be returned to its original value by incrementing the DAC by the predetermined amount and here, by two. In addition, the calPass signal 226 will be flagged at block 294 because before decrementing the DAC in block 282, it was determined in decision block 258 that the PFM comparator 114 was above the PWM regulation point, and after decrementing the DAC in block 282, it was determined that the PFM comparator threshold 42 was not too high. In other words, the PFM comparator threshold 42 was determined to be at a proper level because FBHI=0 initially and FBHI changed to 1 when the DAC was decremented by two counts.

Whenever the calibration state machine 204 determines that the PFM comparator reference 42 should be changed, the calFail signal 228 is flagged (i.e., in block 272 or block 290 in FIG. 5), which causes the calReady state machine 224 to set the calReady signal 184 to 0. The calPass signal 226 is flagged when the calibration state machine 204 determines that the PFM reference 42 properly set.

It is important to note that when the DAC value 42 is very close to the PWM regulation point, the PFM comparator 114 may be unable to resolve its output fast enough for the state machine speed, which may result in the PFM comparator holding its previous state. When incrementing the DAC 194 (e.g., in block 270), this issue will self correct because incrementing the DAC will forcing the PFM comparator to resolve more quickly and only result in PFM comparator reference 42 being further above the PWM regulation point. When checking the PFM reference by decrementing however (e.g., block 282), this issue can cause the digital controller 170 to erroneously determine that the PFM reference 42 is too high when in reality it is very close to the PWM regulation point. Therefore, instead of decrementing the DAC by one LSB, the calibration state machine 204 decrements by two LSBs in block 282, to provide more overdrive to the PFM comparator 114 thereby enabling the comparator to more quickly to resolve its proper output level.

As shown in FIG. 5, the calibration state machine 204 will continuously check the PFM comparator threshold 42 even after the calPass signal 226 has been flagged at block 294. As will be described in connection with operation of the calReady state machine 224 in FIG. 6, assertion of the calPass signal 226 will result in calReady=1 after some delay, and the calFail signal 228 will force calReady=0. If the load current remains high enough to require PWM regulation (i.e., the load current has not fallen to a level that causes the PFM comparator 114 to trip), then the regulator 10 will continue to run in PWM mode and continue to calibrate the PFM comparator 114 even after calReady=1. On the other hand, at light loads once calReady=1, the regulator 10 will begin to operate in PFM mode by forcing the COMP voltage 110 to not drop below the clamp level 180, tripping the PFM comparator 114 and holding the oscillator via the Hold oscillator input at the output of the AND gate 140. If calReady=0 at light loads, then the regulator 10 will use PWM mode to maintain regulation, until the PFM comparator 114 has been calibrated.

In some embodiments, it may be desirable to force the regulator to operate in PWM mode (i.e., forced PWM mode) to keep the regulator continuously on for various reasons, such as to support certain functions (e.g., a delay timer for an external Power on Reset feature) or to ensure a constant operating frequency for EMI/EMC purposes. In forced PWM mode, the COMP clamp 180 is disabled (such as may be implemented by masking the calReady signal 184 in response to a user input as one example), using AND gate 172, allowing the error amplifier 106 to control the inductor current down to very low peak currents. At extremely light loads or no load, an asynchronous Buck converter cannot maintain regulation, and therefore pulse skipping techniques may be used to maintain regulation. One such technique introduces a pedestal on the COMP node such that when the COMP voltage 110 falls below this pedestal, switching is disabled. This allows PWM regulation with no load, while keeping the clock running In the pulse skip PWM mode, the calibration state machine 204 still operates. To ensure appropriate delays, the delay counter 220 is paused when skipping pulses, and resumed when the switch node 18 becomes active. This extends the delay time to prevent a miscalibration during pulse skipping.

Figure 6:
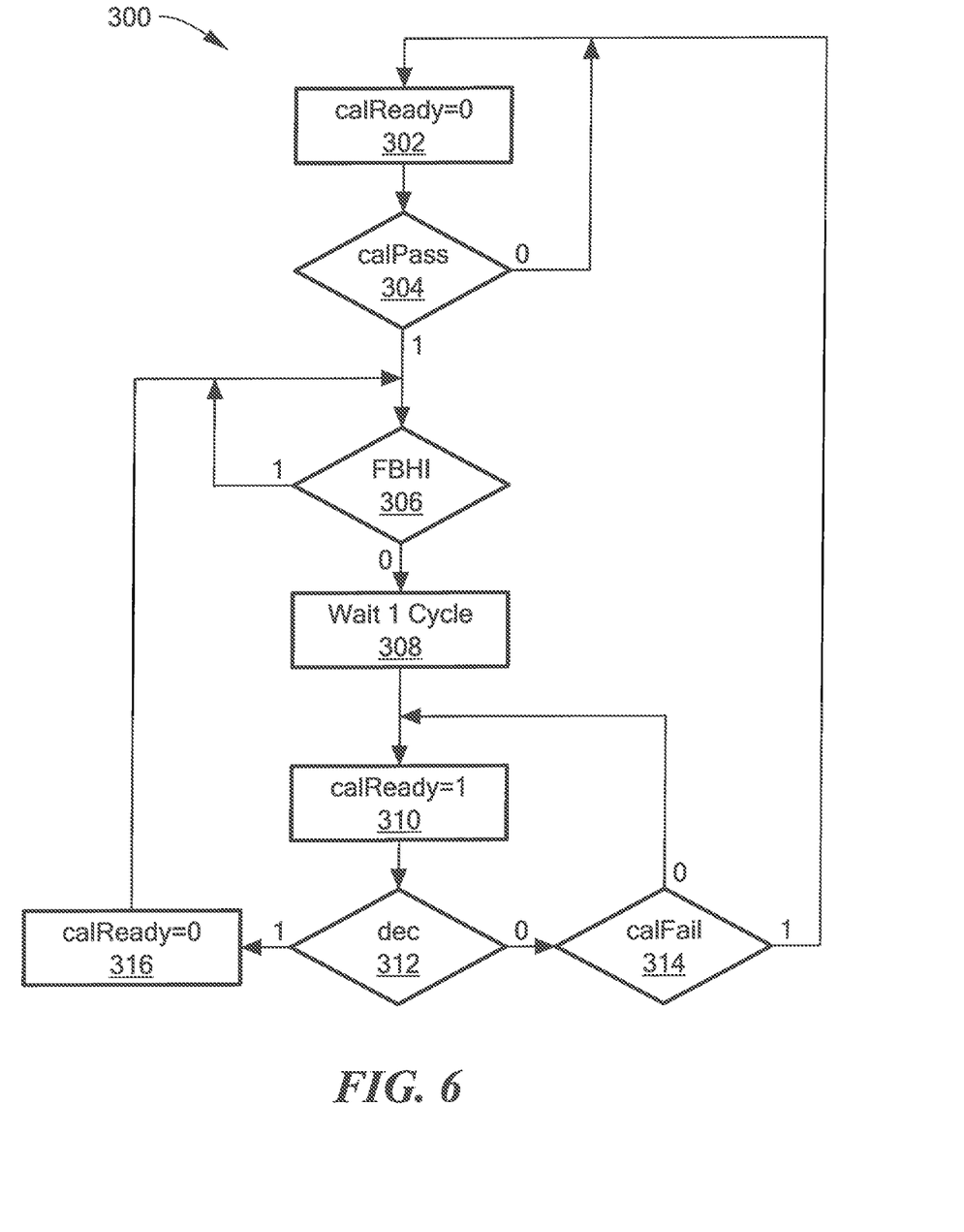
FIG. 6 is a flow diagram illustrating operation of the calReady state machine of FIG. 4.

Referring also to FIG. 6, a flow diagram illustrating operation of the calReady state machine 224 is shown. The calReady state machine 224 generates the calReady signal 184 in response to the calPass signal 226 and the calFail signal 228 from the calibration state machine 204. The process commences at block 302 with the calReady signal 184 set to zero. If it is determined in decision block 304 that the calPass signal 226 is set to 1 (i.e., that the PFM reference 42 is not too high), then the state of the FBHI signal 122 is monitored in decision block 306. Alternatively, if the calPass signal 226 is set to 0, then the process returns to block 302 as shown.

Once the FBHI signal 122 goes low, the calReady state machine 224 implements a wait state in block 308 by waiting one or more clock cycles in order to allow the PFM comparator 114 to resolve to FBHI=0 after decrementing the reference and before enabling PFM mode. This operation is enabled by the decrement of the register 200, and prevents the regulator from mistakenly going into PFM mode due to the slow response of the PFM comparator 114.

In block 310, the calReady signal 184 is set to one, following which it is determined in decision block 312 whether the decrement signal 206 is asserted. If the decrement signal is asserted, then the calReady signal is set to zero in block 316 and the process repeats beginning at block 306. Alternatively, if the decrement signal is not asserted, then the calFail signal 228 is monitored in block 314. If the calFail signal 228 is asserted, then the process repeats beginning at block 302. Alternatively, if the calFail signal is not asserted, then the process repeats beginning at block 310, as shown.

In addition to the calibration routine, the calibration state machine 204 also handles when the DAC 194 reaches its minimum and maximum values. Without special consideration, the DAC could roll over from the minimum value to the maximum value. Therefore, when the minimum value is reached, the register is designed to remain at that value until an increment request is made. In addition, a calPass=1 condition is forced to allow the regulator to enter PFM mode because it is not harmful to the system for the PFM comparator threshold to be too high. On the other hand, if the register reaches the maximum value, the register will also remain at the maximum value until a decrement occurs, but calReady=1 will only occur if the calibration routine indicates that the threshold has been properly calibrated. Setting the PFM threshold too low can negatively impact PWM regulation because the PFM comparator 114 will override the error amplifier operation.

In addition to the calReady signal 184 and the FBHI signal 122, the AND gate 140 that establishes PFM operation, is also responsive to the compLo signal 176. Use of the compLo signal 176 in this manner prevents PFM mode from falsely occurring during heavy loads. The compLo signal 176 also will prevent the PFM comparator 114 from impacting the PWM response to transients.

In the above-described calibration, the PFM reference 42 is continuously calibrated when the regulator 10 is operating in PWM mode, but its calibrated value is held when the regulator operates in PFM mode. In some embodiments, it may be desirable to force the regulator into PWM operation in order to recalibrate the PFM reference 42, such as upon the occurrence of a predetermined condition. Illustrative conditions that may be used to force the regulator into PWM mode to recalibrate the PFM threshold 42 include a predetermined period of time lapsing, a transient event, or some other event.

Figure 7:
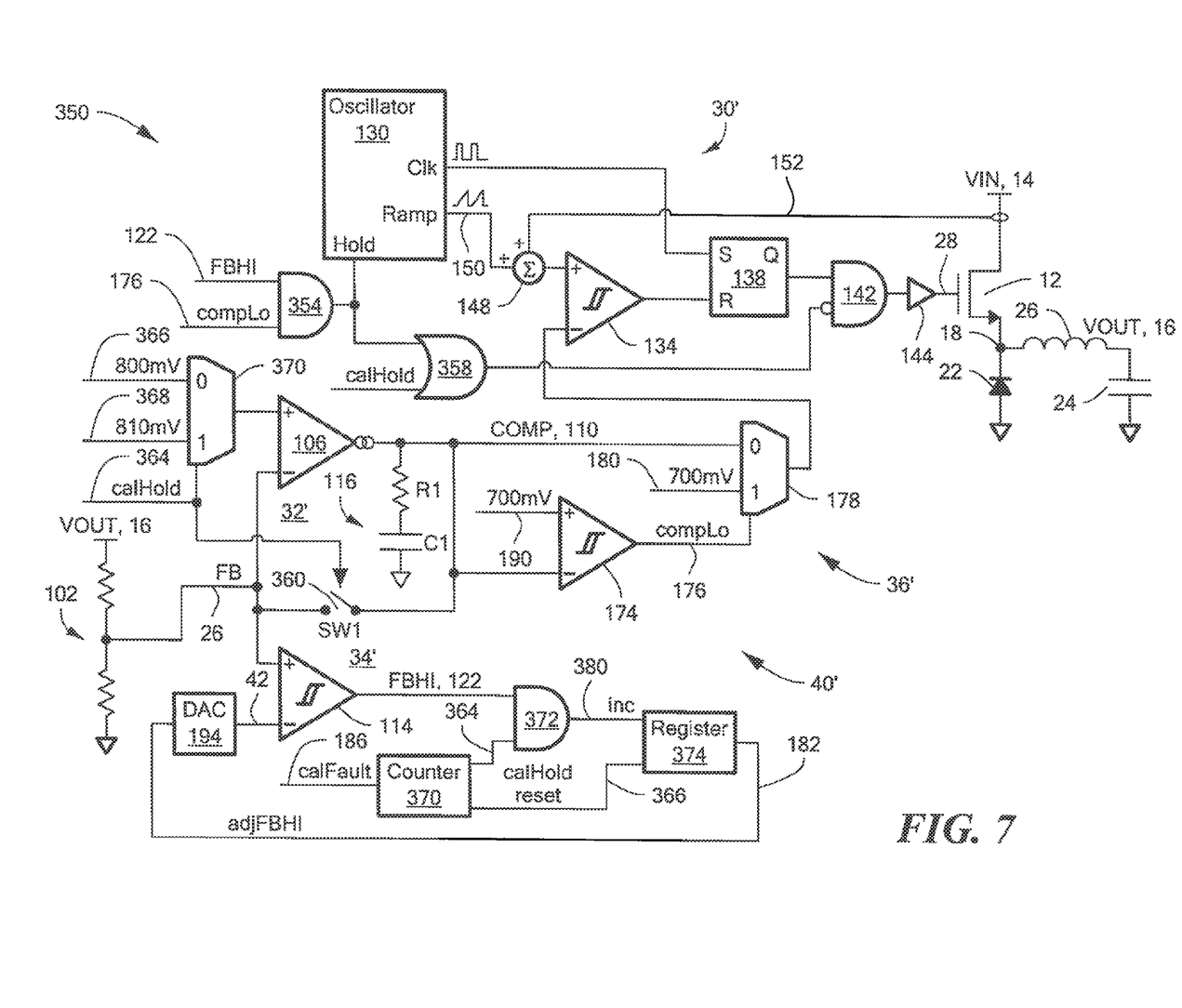
FIG. 7 is a simplified schematic of a switching regulator according to an alternative embodiment.

Referring also to FIG. 7, an alternative regulator 350 is shown, in which like elements are labeled with like reference characters. Regulator 350, like regulator 10 (FIG. 2), is a Buck regulator capable of operation in two modes, a PWM mode and a PFM mode. To this end, regulator 350 includes a control circuit 30' which in turn includes a PWM control circuit 32' that provides PWM control signal COMP 110, a PFM control circuit 34' that provides PFM control signal FBHI 122, and a combining circuit 36' that is responsive to COMP signal 110 to select whether the PWM or PFM control signals generate the switch control signal 28. Here, the combining circuit 36' includes comparator 174, analog mux 178, and the AND gate 142.

A regulation mode calibration circuit 40', like calibration circuit 40 (FIG. 2), is coupled between the PWM control circuit 32' and the PFM control circuit 34' to generate the PFM reference signal 42 in response to the PWM control circuit. More particularly, the calibration circuit 40' calibrates the PFM regulation point to be close to the PWM regulation point (i.e., calibrates the PFM reference 42 to have a predetermined relationship with respect to the PWM regulation point). However, the regulator 350 differs from the regulator 10 of FIG. 2 in that regulator 350 calibrates the PFM comparator reference 42 only at start up of the regulator and when the regulator is restarted, due to a fault condition for example.

The PFM comparator reference 42 is calibrated in response to the output of the error amplifier 106 when the error amplifier is connected in a unity gain configuration. To this end, a switch 360 is coupled between the output and the inverting input of the error amplifier 106, such that when the switch is closed, the inverting input of the PFM comparator 114 is coupled to a voltage level that reflects input offset and gain error of the error amplifier. The switch 360 is controlled by a calHold signal 364 to close when calibration is desired. The compensation network 116 remains connected to the error amplifier output during calibration to ensure that the error amplifier is stable, and any offsets created by this network are included in the calibration.

The regulation mode calibration circuit 40' includes, in addition to switch 360, a counter 370 that is responsive to the calFault signal 186 to generate the calHold signal 364 and a reset signal 366. The calHold signal 364 and the FBHI signal 122 are coupled to an AND gate 372 that provides an increment signal 380 to a register 374 that is additionally responsive to the reset signal 366. Operation of the regulation mode calibration circuit 40' will be described in connection with FIG. 8.

The error amplifier 106 is responsive to a selectable reference, here selectable between a reference voltage 366 such as the illustrated 800 mV and a reference voltage 368 such as the illustrated 810 mV. More particularly, reference voltages 366 and 368 are coupled to a multiplexer 370 which provides the selectable reference voltage to the non-inverting input of the error amplifier 106 in response to the calHold signal 364. In one embodiment, a lower reference voltage 366 is used during PWM operation and a higher reference voltage 368 is used to calibrate the PFM reference 42, thereby providing an additional separation between the PWM regulation point and the PFM reference to account for PWM regulation across line conditions, load conditions, and temperature changes.

During PWM operation, the current comparator 134 controls the switch 12 and the PFM control circuit 34' does not affect the switch operation. Once the load conditions become so light as to cause the output voltage 16 to rise to a point where the nominal error amplifier reference 366 is exceeded by the FB signal 26, the COMP signal 110 falls. If the output voltage continues to rise, then the comparator 174 will trip, causing the multiplexer 178 to select the clamp reference 180 as the input to the current comparator 134. Once the COMP signal level is clamped in this manner, the inductor current is set to a fixed, minimum level (i.e., similar to operation during time T2 in FIG. 3). Once the output voltage 16 is at a level that causes the PFM comparator 114 to trip, presuming that calibration is completed (i.e., the calHold 364 is high), the switch 12 is controlled in a PFM fashion since the outputs of gates 354 and 358 will be high.

Figure 8:
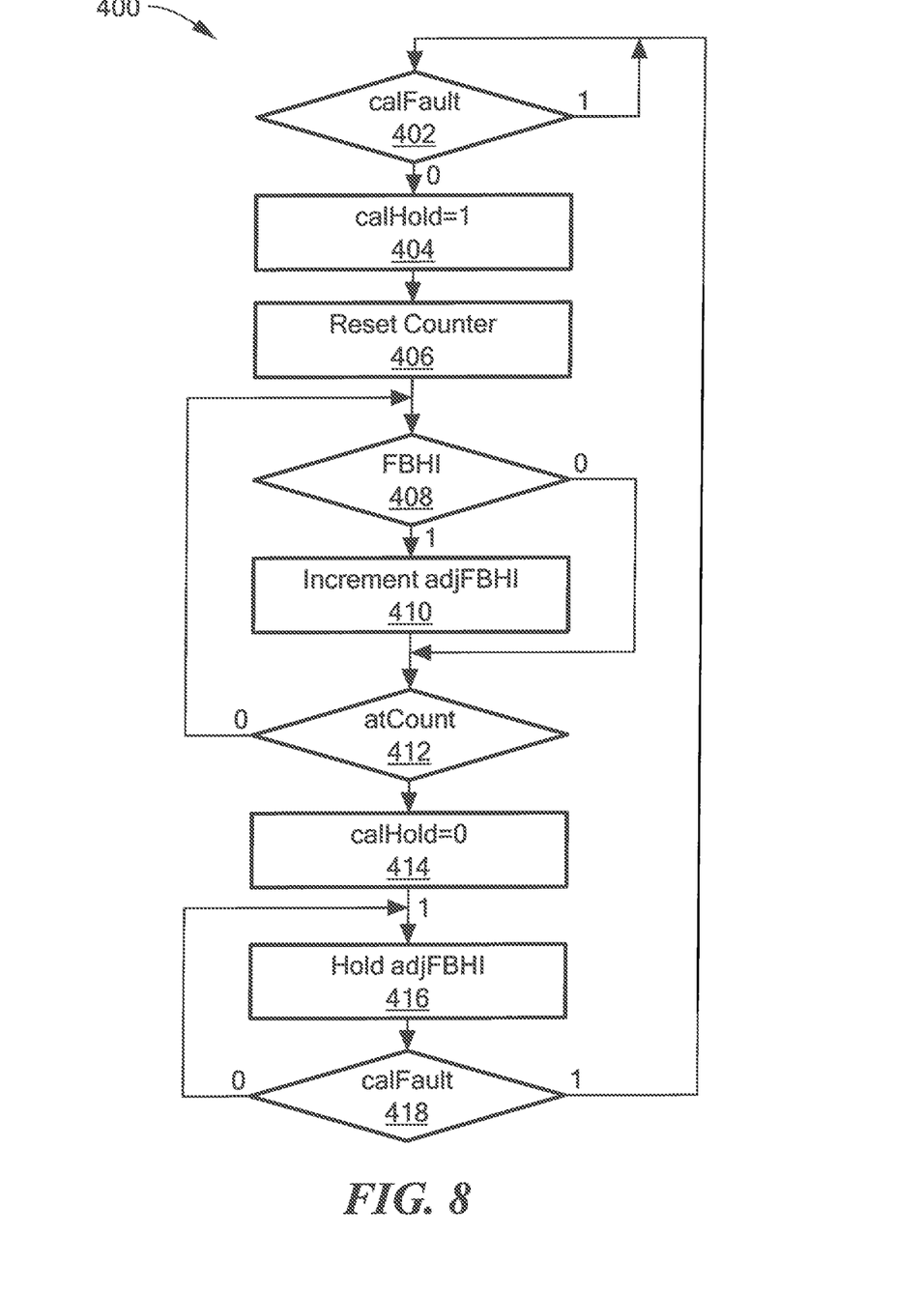
FIG. 8 is a flow diagram illustrating operation of the regulator of FIG. 7.

Referring also to FIG. 8, a flow diagram 400 is shown that illustrates operation of the regulation mode calibration circuit 40' in calibrating the PFM reference 42. In block 402, the calFault signal 186 is monitored until it is no longer asserted. Once it is determined that the calFault signal 186 is no longer asserted, thereby indicating that no regulator faults are present, the calHold signal 364 is asserted (block 404) and the counter 370 is reset by the reset signal 366 (block 406), thereby initiating calibration of the PFM reference.

During calibration, the error amplifier 106 is connected in a unity gain arrangement. More particularly, transition of the calHold signal 364 causes the switch 360 to close. Also, when the calHold signal 366 transitions, the error amplifier reference is increased to the level of reference signal 368 by operation for the multiplexer 370. During calibration, the regulator 350 is held off by the calHold signal, which disables the operation of the switch 12 via OR gate 358 (FIG. 7) and holds any soft start signal that may be present low (not shown in FIG. 7 for simplicity of illustration).

In this embodiment, calibration is performed for a predetermined number of cycles, which is selected based on the settling time of the error amplifier 106 with the compensation network 116 connected. Calibration is performed by incrementing the register 374 by a predetermined amount, such as by 1, each cycle that the FBHI signal is asserted, which indicates that the PFM comparator reference 42 is too low (i.e., the PFM regulation point is below the PWM regulation point). More particularly, in block 408, the FBHI signal 122 is monitored. If the FBHI signal is asserted and the predetermined number of cycles has not lapsed (i.e., as determined in block 412 by an atCount signal as may be internal to the counter 370 being low), then the adjFBHI DAC control signal 182 is incremented in block 410. If alternatively, the FBHI signal is at zero, then the DAC control signal 182 is not incremented and the FBHI signal continues to be monitored.

Once it is determined that the predetermined number of cycles has lapsed (block 412), the regulator 350 will enter normal operation. More particularly, at block 414, the calHold signal 364 is set to zero, thereby commencing normal operation. With this arrangement, the PFM reference signal 42 is adjusted during a predetermined duration in response to a regulator start or restart event In normal operation, the DAC control signal 182 is held at its calibrated level (block 416) and the calFault signal 186 is monitored and the control signal 182 is held until the calFault signal indicates the presence of a fault that will initiate another calibration of the PFM reference 42.

All references cited herein are hereby incorporated herein by reference in their entirety.

Having described preferred embodiments of the invention, it will now become apparent to one of ordinary skill in the art that other embodiments incorporating their concepts may be used.

For example, it will be appreciated by those of ordinary skill in the art that the techniques described herein are applicable to any regulator that implements two or more modes of operation. Such regulators may take the form of various topologies, such as Buck, Boost, Buck-Boost, Flyback, SEPIC, Cúk, Half-Bridge, or Full Bridge. Furthermore, the regulator may regulate a current, power or other parameter, rather than an output voltage as in the illustrative embodiments.

It is felt therefore that these embodiments should not be limited to disclosed embodiments, but rather should be limited only by the spirit and scope of the appended claims.

What is claimed is:

1. A switching regulator control circuit for controlling a switching regulator comprising at least one switch that conducts to transfer energy from an input source to an output at which a regulated output is provided, the switching regulator control circuit comprising:
   a first control circuit to generate a first control signal to control conduction of the at least one switch during a first mode of operation and having a first input responsive to a first reference signal, a second input responsive to a feedback signal proportional to the regulated output, and an output at which the first control signal is provided; and
   a second control circuit to generate a second control signal to control conduction of the at least one switch during a second mode of operation and having a first input responsive to a second reference signal, a second input responsive to the feedback signal, and an output at which the second control signal is provided; and
   a regulation mode calibration circuit coupled between the first control circuit and the second control circuit for calibrating the second reference signal in response to the first control circuit.

2. The switching regulator control circuit of claim 1 wherein the first control circuit is a PWM control circuit and the second control circuit is a PFM control circuit.

3. The switching regulator control circuit of claim 1 further comprising a combining circuit responsive to the first control signal and the second control signal for generating at least one switch control signal for coupling to the at least one switch.

4. The switching regulator control circuit of claim 3 wherein the at least one switch control signal is a function of the first control signal when the first control signal is greater than a reference signal.

5. The switching regulator control circuit of claim 4 wherein the first control circuit comprises an error amplifier to provide the first control signal at a variable level when the first control signal is greater than the reference signal and at a fixed, clamp level when the first control signal is less than the reference signal.

6. The switching regulator control circuit of claim 1 wherein the second control circuit comprises a comparator to provide the second control signal.

7. The switching regulator control circuit of claim 1 wherein the regulation mode calibration circuit comprises a DAC to provide the second reference signal.

8. The switching regulator control circuit of claim 7 wherein the first control circuit has a regulation point and the DAC is adjusted to provide the second reference signal at a level that is a function of the regulation point of the first control circuit.

9. The switching regulator control circuit of claim 8 wherein the regulation mode calibration circuit further comprises a state machine to adjust the DAC until the second reference signal is at a predetermined amount greater than regulation point of the first control circuit.

10. The switching regulator control circuit of claim 9 wherein the DAC is adjusted during the first mode of operation.

11. The switching regulator control circuit of claim 10 wherein the DAC is continuously adjusted during the first mode of operation.

12. The switching regulator control circuit of claim 10 wherein the regulator is forced to operate in the first mode of operation to calibrate the second reference signal.

13. The switching regulator control circuit of claim 9 wherein the state machine increments the DAC, decrements the DAC, or both increments and decrements the DAC to provide the second reference signal at the predetermined amount greater than the regulation point of the first control circuit.

14. The switching regulator control circuit of claim 13 further comprising a delay counter to verify an adjustment to the DAC during a delay time period to avoid adjusting the second reference signal in response to transients in the regulation point of the first control circuit.

15. The switching regulator control circuit of claim 8 wherein the regulation mode calibration circuit further comprises a register to increment the DAC for a predetermined duration.

16. The switching regulator control circuit of claim 15 wherein the regulation mode calibration circuit adjusts the second reference signal only in response to a regulator start or restart event.

17. The switching regulator control circuit of claim 15 wherein the first control circuit comprises an error amplifier and wherein the error amplifier is coupled in a unity gain configuration when the regulation mode calibration circuit adjusts the second reference signal.

18. A switching regulator control circuit for controlling a switching regulator comprising at least one switch that conducts to transfer energy from an input source to an output at which a regulated output is provided, the switching regulator control circuit comprising:
a first control circuit to control conduction of the switch according to a first mode of operation and having a regulation point comprising an average level of the regulated output during the first mode of operation; and
a second control circuit to control conduction of the switch according to a second mode of operation and having at least one input responsive to a reference signal, wherein the reference signal is calibrated to be within a predetermined range of the regulation point of the first control circuit.

19. The switching regulator control circuit of claim 18 wherein the first mode of operation is PWM operation and the second mode of operation is PFM operation.

20. The switching regulator control circuit of claim 18 wherein the reference signal is calibrated to be a predetermined amount greater than the regulation point of the first control circuit.

21. The switching regulator control circuit of claim 18 wherein the reference signal is calibrated during the first mode of operation.

22. The switching regulator control circuit of claim 18 wherein the reference signal is calibrated only in response to a regulator start or restart event.

23. A method of controlling transitioning between two modes of operation in a regulator comprising:
determining a regulation point associated with a first mode of operation and a first control circuit, wherein the regulation point comprises an average level of a regulated output of the regulator during the first mode of operation; and
calibrating a reference signal used during a second mode of operation to be within a predetermined range of the regulation point associated with the first mode of operation, wherein the reference signal is an input to a second control circuit.

24. The method of claim 23 wherein the first mode of operation is PWM operation and the second mode of operation is PFM operation.

25. The method of claim 23 wherein calibrating the reference signal comprises setting the reference signal to a predetermined amount greater than the regulation point.

26. The method of claim 23 wherein calibrating the reference signal comprises maintaining the reference signal at the predetermined amount greater than the regulation point.

27. The method of claim 23 wherein the reference signal is calibrated when the regulator operates in the first mode of operation.

28. The method of claim 27 further comprising forcing the regulator to operate in the first mode of operation to calibrate the reference signal.

29. The method of claim 27 wherein calibrating the reference signal comprises incrementing the reference signal, decrementing the reference signal, or both incrementing and decrementing the reference signal.

30. The method of claim 29 wherein calibrating the reference signal comprises verifying incrementing or decrementing the reference signal to avoid calibrating the reference signal in response to transients in the regulation point.

31. The method of claim 23 wherein calibrating the reference signal comprises adjusting the reference signal during a predetermined duration in response to a regulator start or restart event.

* * * * *

UNITED STATES PATENT AND TRADEMARK OFFICE
CERTIFICATE OF CORRECTION

PATENT NO. : 9,621,036 B2  
APPLICATION NO. : 14/132534  
DATED : April 11, 2017  
INVENTOR(S) : Joshua Wibben Page 1 of 1

It is certified that error appears in the above-identified patent and that said Letters Patent is hereby corrected as shown below:

On the Title Page

In item (71), delete "Allegro Microsystems, LLC" and replace with --Allegro MicroSystems, LLC--

In the Specification

Column 2, Line 59, delete "comprises" and replace with --comprise--

Column 7, Line 35, delete "However with the use" and replace with --However, with the use--

Column 10, Line 23, delete "DAC will forcing" and replace with --DAC will force--

Column 10, Line 34, delete "to resolve" and replace with --resolve--

Column 11, Line 6, delete "running In the pulse" and replace with --running in the pulse--

Column 13, Line 67, delete "event" and replace with --event.--

Signed and Sealed this  
Twenty-ninth Day of May, 2018

Andrei Iancu  
*Director of the United States Patent and Trademark Office*